United States Patent
Vega et al.

(10) Patent No.: US 10,761,409 B2
(45) Date of Patent: Sep. 1, 2020

(54) SURVEILLANCE CAMERA ENCLOSURE

(71) Applicant: Parabit Systems, Inc., Roosevelt, NY (US)

(72) Inventors: Luis Emilio Vega, Woodland Park, NJ (US); Mohammad Hasani, Brooklyn, NY (US)

(73) Assignee: Parabit Systems, Inc., Roosevelt, NY (US)

(*) Notice: Subject to any disclaimer, the term of this patent is extended or adjusted under 35 U.S.C. 154(b) by 19 days.

(21) Appl. No.: 16/246,926

(22) Filed: Jan. 14, 2019

(65) Prior Publication Data
US 2019/0219899 A1    Jul. 18, 2019

Related U.S. Application Data

(60) Provisional application No. 62/617,153, filed on Jan. 12, 2018.

(51) Int. Cl.
*G03B 17/56*    (2006.01)
(52) U.S. Cl.
CPC .................. *G03B 17/561* (2013.01)
(58) Field of Classification Search
None
See application file for complete search history.

(56) References Cited

U.S. PATENT DOCUMENTS

| | | |
|---|---|---|
| 2,227,974 A | 1/1941 | Hughey |
| D275,658 S | 9/1984 | Kahl, Jr. et al. |
| D294,211 S | 2/1988 | Lax et al. |
| 4,805,729 A | 2/1989 | Wascom |

(Continued)

FOREIGN PATENT DOCUMENTS

| | | |
|---|---|---|
| CN | 304665368 | 6/2018 |
| CN | 304665384 | 6/2019 |
| KR | 301007263 | 5/2019 |

OTHER PUBLICATIONS

Bandit Barrier Cameras and Enclosures, no publication date available [online], [retrieved Jun. 8, 2019], Avaialable from Internet, URL: https://www.parabit.com/cameras-enclosures, pp. 8.

(Continued)

*Primary Examiner* — Clayton E. LaBalle
*Assistant Examiner* — Dennis Hancock
(74) *Attorney, Agent, or Firm* — Gerald Hespos; Michael Porco; Matthew Hespos

(57) ABSTRACT

The present disclosure provides for an adjustable camera enclosure. The camera enclosure includes a housing, a camera mounting assembly, and a base. The housing is aligned along a longitudinal axis and includes a hollow interior, a first end, a second end and an aperture through a wall of the housing. The aperture extends in a direction parallel to the longitudinal axis. The camera mounting assembly is disposed in the hollow interior of the housing and slidable within the hollow interior along the longitudinal axis. The camera mounting assembly can receive a camera such that a lens of the camera is oriented to the aperture of the housing. The base is coupled to the second end of the housing and is mountable to a surface. The base is rotatable about the longitudinal axis relative to the surface to rotate the housing about the longitudinal axis.

19 Claims, 18 Drawing Sheets

(56) References Cited

U.S. PATENT DOCUMENTS

| | | |
|---|---|---|
| D301,696 S | 6/1989 | Greenlee et al. |
| D309,791 S | 8/1990 | Boccato et al. |
| D330,548 S | 10/1992 | Takahashi |
| D342,334 S | 12/1993 | Vakil |
| D359,922 S | 7/1995 | Sandell |
| D359,923 S | 7/1995 | Sandell |
| D365,834 S | 1/1996 | Dozier |
| D395,408 S | 6/1998 | Wiesemann |
| D399,517 S | 10/1998 | Hasegawa |
| D420,458 S | 2/2000 | Guercio |
| D425,534 S | 5/2000 | Mutoh et al. |
| D428,352 S | 7/2000 | Hiller et al. |
| D438,998 S | 3/2001 | Finke et al. |
| D446,531 S | 8/2001 | Beck |
| D455,164 S | 4/2002 | Tsang et al. |
| D456,432 S | 4/2002 | Kim |
| 6,375,370 B1 | 4/2002 | Wesselink et al. |
| D459,378 S | 6/2002 | Masamitsu et al. |
| 6,411,332 B1 | 6/2002 | Whitby et al. |
| D468,333 S | 1/2003 | Fenton |
| 6,554,499 B1* | 4/2003 | Gumpenberger ...... H04N 7/183 348/143 |
| D477,345 S | 7/2003 | Hildreth |
| D486,847 S | 2/2004 | Uehara |
| D487,764 S | 3/2004 | Adachi et al. |
| D501,494 S | 2/2005 | Ogura |
| D517,585 S | 3/2006 | Iino et al. |
| D520,548 S | 5/2006 | Tsai |
| D532,809 S | 11/2006 | Shih |
| D533,575 S | 12/2006 | Reawsanguanwong et al. |
| D535,204 S | 1/2007 | Bender et al. |
| D542,319 S | 5/2007 | Ishida et al. |
| D543,567 S | 5/2007 | Kato et al. |
| 7,217,044 B1 | 5/2007 | Marks, Jr. |
| D548,763 S | 8/2007 | Boris |
| D550,266 S | 9/2007 | Lau |
| D550,267 S | 9/2007 | Oh et al. |
| D552,650 S | 10/2007 | Yamakawa et al. |
| D554,168 S | 10/2007 | Shi et al. |
| D556,233 S | 11/2007 | Webb |
| D563,133 S | 3/2008 | Kramer |
| 7,346,196 B2 | 3/2008 | Gin |
| D565,631 S | 4/2008 | Morishita |
| D574,742 S | 8/2008 | Spencer |
| D579,474 S | 10/2008 | Yoo et al. |
| D586,028 S | 2/2009 | Condon et al. |
| D594,364 S | 6/2009 | Decker |
| D595,164 S | 6/2009 | Greger et al. |
| D597,117 S | 7/2009 | Yamane et al. |
| D602,970 S | 10/2009 | Lee |
| 7,710,452 B1 | 5/2010 | Lindberg |
| D616,683 S | 6/2010 | Law et al. |
| D624,106 S | 9/2010 | Cho et al. |
| D627,815 S | 11/2010 | Oba |
| 7,893,958 B1 | 2/2011 | D'Agostino |
| D633,930 S | 3/2011 | Dinger et al. |
| D641,771 S | 7/2011 | Sasaki et al. |
| D648,362 S | 11/2011 | Byun |
| D651,229 S | 12/2011 | Tan et al. |
| D664,876 S | 8/2012 | Krumpe et al. |
| D664,878 S | 8/2012 | Schenck et al. |
| 8,593,567 B2 | 11/2013 | Xiao |
| D698,841 S | 2/2014 | Lee et al. |
| D701,893 S | 4/2014 | Bart et al. |
| D708,654 S | 7/2014 | Tani |
| D718,360 S | 11/2014 | Matoba et al. |
| D721,113 S | 1/2015 | Huang |
| D723,395 S | 3/2015 | Dispenza et al. |
| D727,388 S | 4/2015 | Huang et al. |
| D728,655 S | 5/2015 | Daniel |
| D736,845 S | 8/2015 | Yilin |
| D741,395 S | 10/2015 | Oh |
| D743,467 S | 11/2015 | Bhattacharya |
| D746,350 S | 12/2015 | Li |
| D750,681 S | 3/2016 | Takami |
| D751,129 S | 3/2016 | Lellky et al. |
| D751,622 S | 3/2016 | Mao |
| D755,876 S | 5/2016 | Moss |
| D757,146 S | 5/2016 | Walter et al. |
| D759,621 S | 6/2016 | Maxwell |
| D769,956 S | 10/2016 | Hinkel |
| D771,174 S | 11/2016 | Hinkel |
| D783,075 S | 4/2017 | Maxwell |
| D785,694 S | 5/2017 | Fujii et al. |
| D788,834 S | 6/2017 | Bhattacharya et al. |
| D796,725 S | 9/2017 | Recker et al. |
| D800,201 S | 10/2017 | Song |
| D802,199 S | 11/2017 | Zhuo |
| 9,826,128 B1 | 11/2017 | Ballard |
| D805,040 S | 12/2017 | Oksengendler et al. |
| D806,773 S | 1/2018 | Wieser et al. |
| D807,944 S | 1/2018 | Worthington et al. |
| D809,045 S | 1/2018 | Jou |
| D811,461 S | 2/2018 | Chen et al. |
| D811,770 S | 3/2018 | Brownley et al. |
| D813,213 S | 3/2018 | Honda |
| 9,983,462 B2* | 5/2018 | Leiponis .............. G03B 17/561 |
| D820,894 S | 6/2018 | Tang |
| D822,745 S | 7/2018 | Shang |
| D825,639 S | 8/2018 | Kan et al. |
| D826,941 S | 8/2018 | Zhou et al. |
| D828,187 S | 9/2018 | O'Neill et al. |
| D828,201 S | 9/2018 | Jeong |
| D833,504 S | 11/2018 | Leiponis |
| D840,851 S | 2/2019 | Ammar |
| D841,073 S | 2/2019 | Leiponis |
| D842,620 S | 3/2019 | Brownley et al. |
| D848,507 S | 5/2019 | Marx |
| D849,095 S | 5/2019 | Puric et al. |
| D849,104 S | 5/2019 | Wong et al. |
| D849,815 S | 5/2019 | Osborne et al. |
| D850,509 S | 6/2019 | Tsai |
| D852,071 S | 6/2019 | Laurans et al. |
| D852,074 S | 6/2019 | Laurans et al. |
| D854,070 S | 7/2019 | Tani et al. |
| D858,605 S | 9/2019 | Tang et al. |
| D862,560 S | 10/2019 | Moy et al. |
| D863,401 S | 10/2019 | Hasani |
| D863,409 S | 10/2019 | Wang et al. |
| D866,381 S | 11/2019 | Siminoff et al. |
| D866,632 S | 11/2019 | Siminoff et al. |
| D870,175 S | 12/2019 | Sponring |
| D870,791 S | 12/2019 | Hasani |
| D872,790 S | 1/2020 | Hasegawa et al. |
| D873,828 S | 1/2020 | Zhou et al. |
| D876,519 S | 2/2020 | Yannay |
| D877,227 S | 3/2020 | Seflic et al. |
| D881,259 S | 4/2020 | Wang |
| D887,477 S | 6/2020 | Vega |
| 2004/0139812 A1 | 7/2004 | Erel et al. |
| 2006/0062570 A1 | 3/2006 | Kikuchi et al. |
| 2006/0250260 A1 | 11/2006 | Albert et al. |
| 2010/0059550 A1 | 3/2010 | Ciavarella et al. |
| 2013/0107110 A1 | 5/2013 | Park et al. |
| 2013/0215322 A1 | 8/2013 | Haler |
| 2013/0302024 A1* | 11/2013 | Eckert .................. G03B 17/561 396/427 |
| 2015/0012168 A1* | 1/2015 | Kuklish ............... F16M 11/425 701/23 |
| 2017/0068149 A1* | 3/2017 | Fromm ................ F16M 11/041 |
| 2017/0192343 A1 | 7/2017 | Leiponis et al. |
| 2019/0219899 A1 | 7/2019 | Vega et al. |

OTHER PUBLICATIONS

Covert Color Camera, Tower Camera CTV36PB; Specification Sheet; Advanced Technology Video; pp. 1-2; Copyright 2011.
Tower Camera Quick Installation Guide; Advanced Technology Video; pp. 1-12.
Parabit CCTV Camera enclosure for airports, published 2020 [online], [retrieved Mar. 28, 2020], Available from Internet, URL: https://www.aeroexpo.online/prod/parabit-systems/product-177577-58197.html.

(56) References Cited

OTHER PUBLICATIONS

XNB-H6280B 2MP Network Bandit Barrier Camera Kit, published 2020 [online], [retrieved Mar. 28, 2020], Available from Internet, URL: https://www.hanwhasecurity.com/xnb-h6280b.html.

* cited by examiner

SURVEILLANCE CAMERA ENCLOSURE

PRIORITY

This application claims priority to U.S. Provisional Patent Application No. 62/617,153, titled "SURVEILLANCE CAMERA ENCLOSURE", filed Jan. 12, 2018, the contents of which are hereby incorporated by reference in its entirety.

TECHNICAL FILED

The present disclosure generally relates to camera systems, and more particularly, to an adjustable surveillance camera enclosure.

BACKGROUND

Any background information described herein is intended to introduce the reader to various aspects of art, which may be related to the present embodiments that are described below. This discussion is believed to be helpful in providing the reader with background information to facilitate a better understanding of the various aspects of the present disclosure. Accordingly, it should be understood that these statements are to be read in this light.

Cameras are used in many settings to take photographs or videos of individuals for identification and/or security purposes. A camera may be used to take a photograph of an individual to save in a database for later reference and/or to create an identification card. Alternatively, a camera may be used to take a photograph or a video for security and surveillance purposes. In many cases, after a camera has been mounted, the camera cannot be easily manipulated to achieve desired viewing angles. Therefore, a need exists for cameras that can be adjusted in a plurality of ways.

SUMMARY

The present disclosure provides for an adjustable camera enclosure. The camera enclosure of the present disclosure is configured to house a variety of different types of cameras, e.g., a miniature camera. Furthermore, the camera enclosure of the present disclosure is configured such that the camera enclosure can be adjusted in a plurality of ways to ensure the camera housed within the camera enclosure can achieve a desired viewing angle and desired height within the camera enclosure. The adjustable camera enclosure of the present disclosure is configured to be mounted to a surface, e.g., a desk, countertop, etc.

In one aspect, the present disclosure provides an apparatus comprising: a housing extending along a longitudinal axis and including a hollow interior, a first end, a second end and an aperture in a wall of the housing, the aperture extending in a direction parallel to the longitudinal axis; a camera mounting assembly disposed in the hollow interior of the housing and slidable within the hollow interior along the longitudinal axis, the camera mounting assembly configured to receive a camera such that a lens of the camera is oriented to the aperture of the housing; and a base coupled to the second end of the housing and configured to be disposed on a surface, wherein the base is configured to be rotatable about the longitudinal axis relative to the surface to rotate the housing about the longitudinal axis.

In another aspect, the present disclosure provides an apparatus comprising: a housing extending along a longitudinal axis and including a hollow interior, a first end, a second end and an aperture in a wall of the housing, the aperture extending in a direction parallel to the longitudinal axis; a camera mounting assembly disposed in the hollow interior of the housing and slidable within the hollow interior along the longitudinal axis, the camera mounting assembly configured to receive a camera such that a lens of the camera is oriented to the camera window of the housing, the camera mounting assembly further configured to enable the camera to be tilted with respect to the housing; and a base coupled to the second end of the housing and configured to be disposed on a surface, wherein the base is configured to be rotatable about the longitudinal axis relative to the surface to rotate the housing about the longitudinal axis.

In another aspect, the present disclosure provides an apparatus comprising: a housing extending along a longitudinal axis and including a hollow interior, a first end, a second end and an aperture in a wall of the housing; a camera mounting assembly disposed in the hollow interior of the housing and configured to receive a camera such that a lens of the camera is oriented to the aperture of the housing, the camera mounting assembly further configured to enable the camera to be tilted with respect to the housing; and a base coupled to the second end of the housing and configured to be disposed on a surface, wherein the base is configured to be rotatable about the longitudinal axis relative to the surface to rotate the housing about the longitudinal axis.

BRIEF DESCRIPTION OF THE DRAWINGS

In the drawings, wherein like reference numerals denote similar elements throughout the views.

Figure 1:
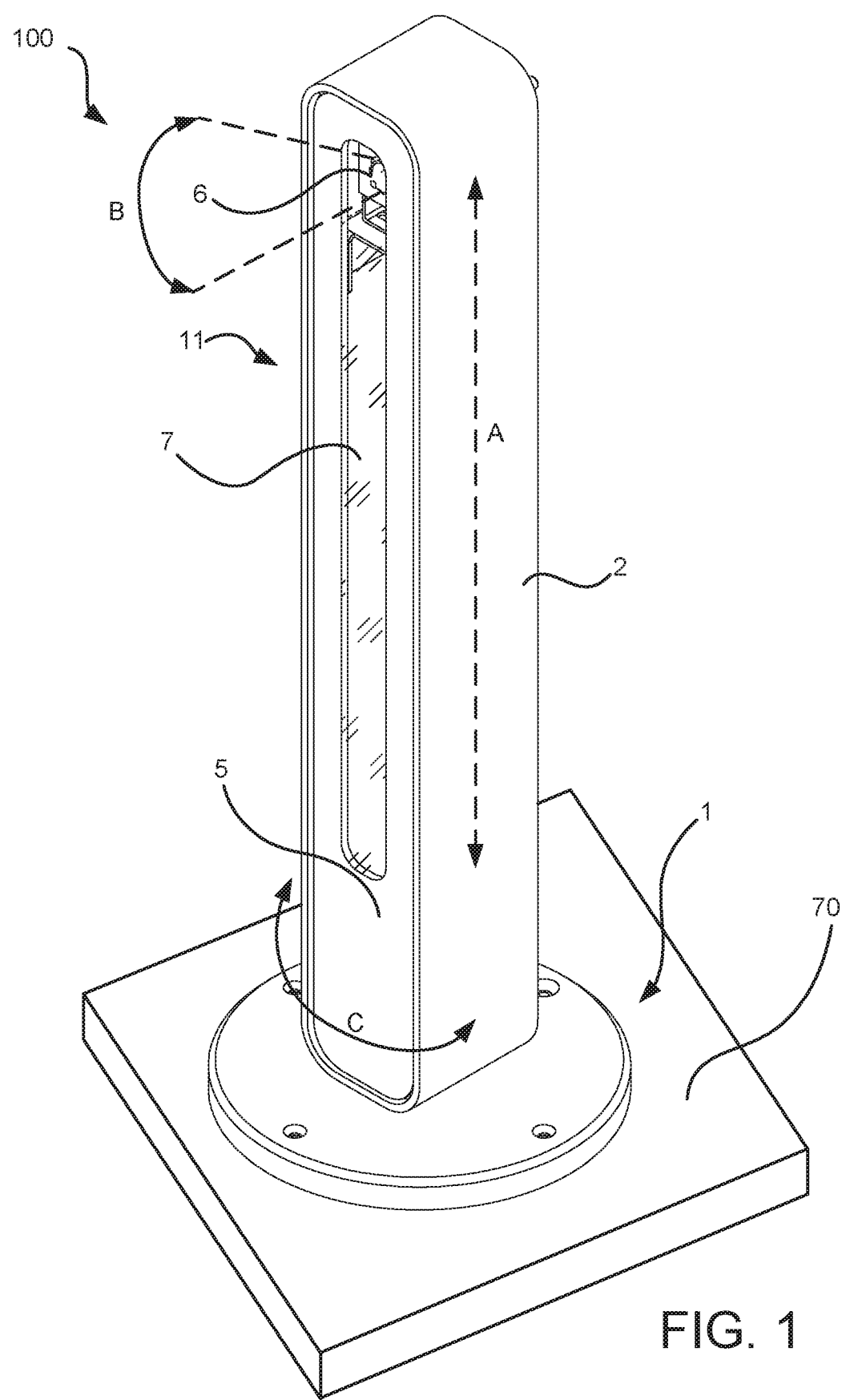
FIG. 1 is a perspective view of a camera enclosure in accordance with an embodiment of the present disclosure.
Figure 2:
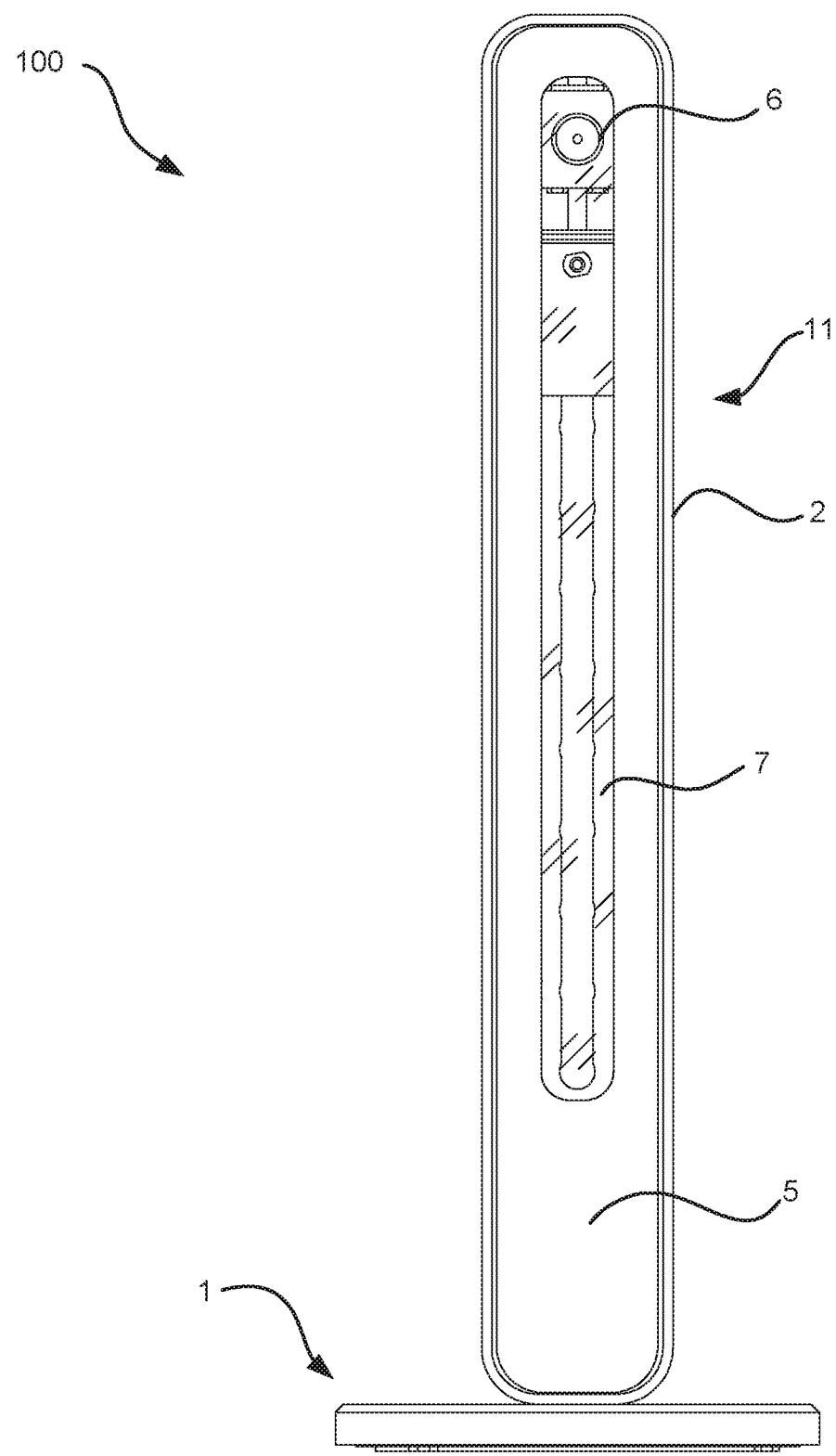
FIG. 2 is front view of the camera enclosure of FIG. 1 in accordance with the present disclosure.

It should be understood that the drawings are for purposes of illustrating the concepts of the present disclosure and are not necessarily the only possible configurations for illustrating the present disclosure.

DETAILED DESCRIPTION

Herein, the phrase "coupled" is defined to mean directly connected to or indirectly connected with through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The present disclosure provides for an adjustable camera enclosure. The camera enclosure of the present disclosure is configured to house a variety of different types of cameras, e.g., a miniature camera. Furthermore, the camera enclosure of the present disclosure is configured such that the camera enclosure can be adjusted in a plurality of ways to ensure the camera housed within the camera enclosure can achieve a desired viewing angle and a desired height within the camera enclosure. The adjustable camera enclosure of the present disclosure is configured to be disposed on and mounted to a surface, e.g., a desk, countertop, etc.

Referring to FIGS. 1-7, a camera enclosure apparatus 100 is shown in accordance with an embodiment of the present disclosure. Camera enclosure 100 includes a housing 11 a base 1 a tilt angle adjustor or lever 26 and a camera height adjustor or knob 25. The housing 11 includes a main body 2, a front face plate 5, and a rear face plat 3. Tilt angle adjustor or lever 26 and a camera height adjustor 25 are disposed through a slot 4 of rear face plate 3. Face plate 5 includes a glass window or transparent portion 7. In one embodiment, face plate 5 is made entirely of glass, with window 7 configured to be transparent and the portions of face plate 5 other than window 7 being opaque. It is to be appreciated that window 7 is configured to protect camera 6 from being exposed to elements exterior to housing 11 while still allowing the lens of camera 6 to view the exterior of housing 11.

As will be described in greater detail below, camera enclosure 100 is configured such that a miniature camera 6, such as, but not limited to, an IP (Internet Protocol) camera or analog camera, is slidably disposed within the interior of main body 2 with the lens of the camera 6 facing transparent portion or window 7 (i.e., viewing toward the exterior of body 2) of face plate 5.

As will be described in greater detail below, enclosure 100 is configured to be coupled to a surface 70 (e.g., a countertop of a desk, table, or other structure) and enable a user to manipulate the position and orientation of camera 6 in a variety of ways. Camera height adjustor 25 is configured to enable a user to adjust the height of camera 6 within housing 11 along the length of window 7, as denoted by the letter A in FIG. 1. Lever 26 is configured to adjust the tilt angle (denoted by the letter B in FIG. 1) of camera 6. Furthermore, base 1 is configured to be rotatably coupled to surface 70, such that housing 2 (and thus camera 2) can be rotated, as denoted by letter C in FIG. 1, relative to surface 70. In this way, camera 6 may be adjusted by a user to achieve any one of a plurality of positions and orientations thereby manipulating the field of view of the lens of camera 6.

Figure 8:
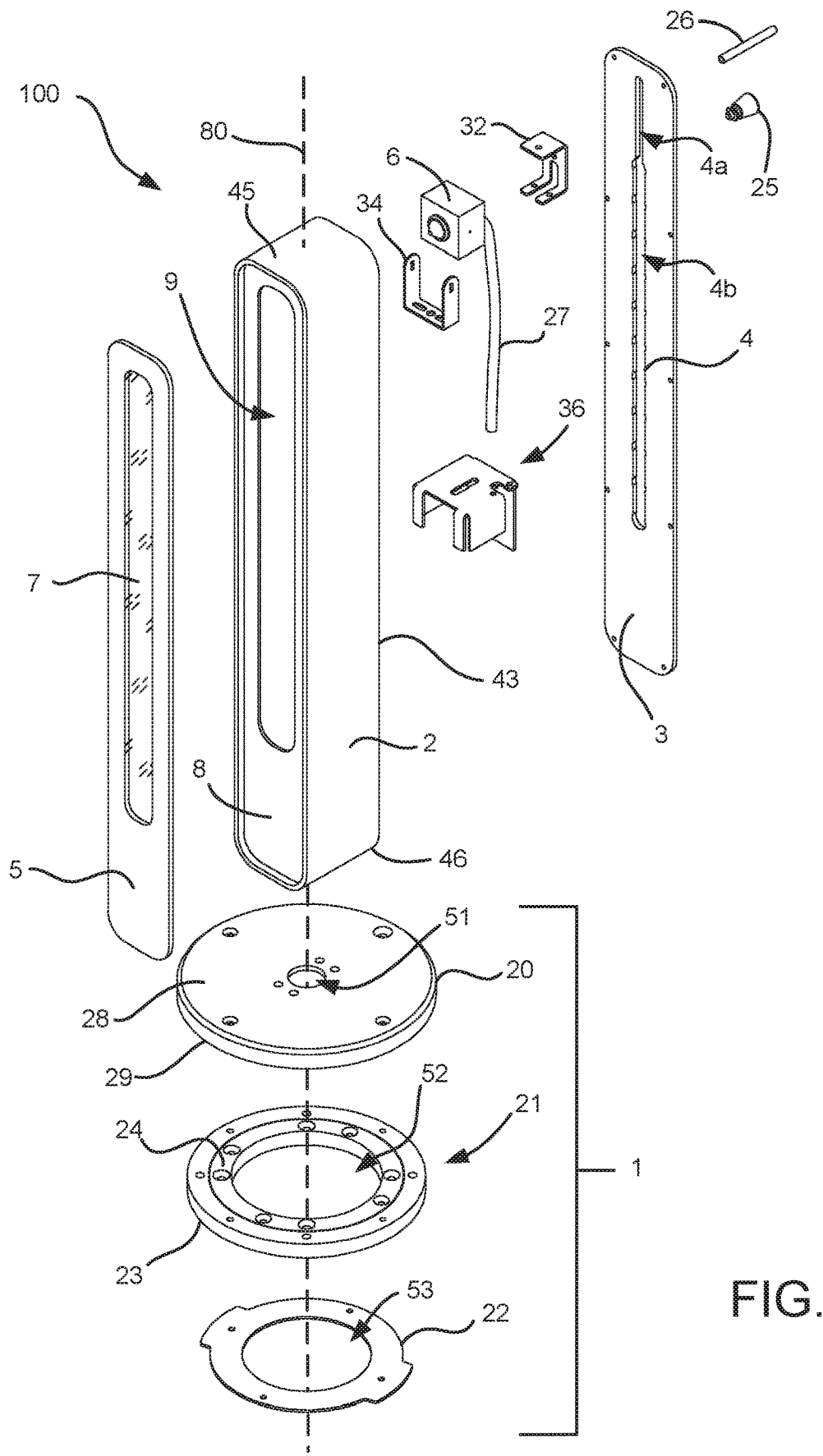
FIG. 8 is an exploded perspective view of the camera enclosure of FIG. 1 in accordance with the present disclosure.
Figure 9:
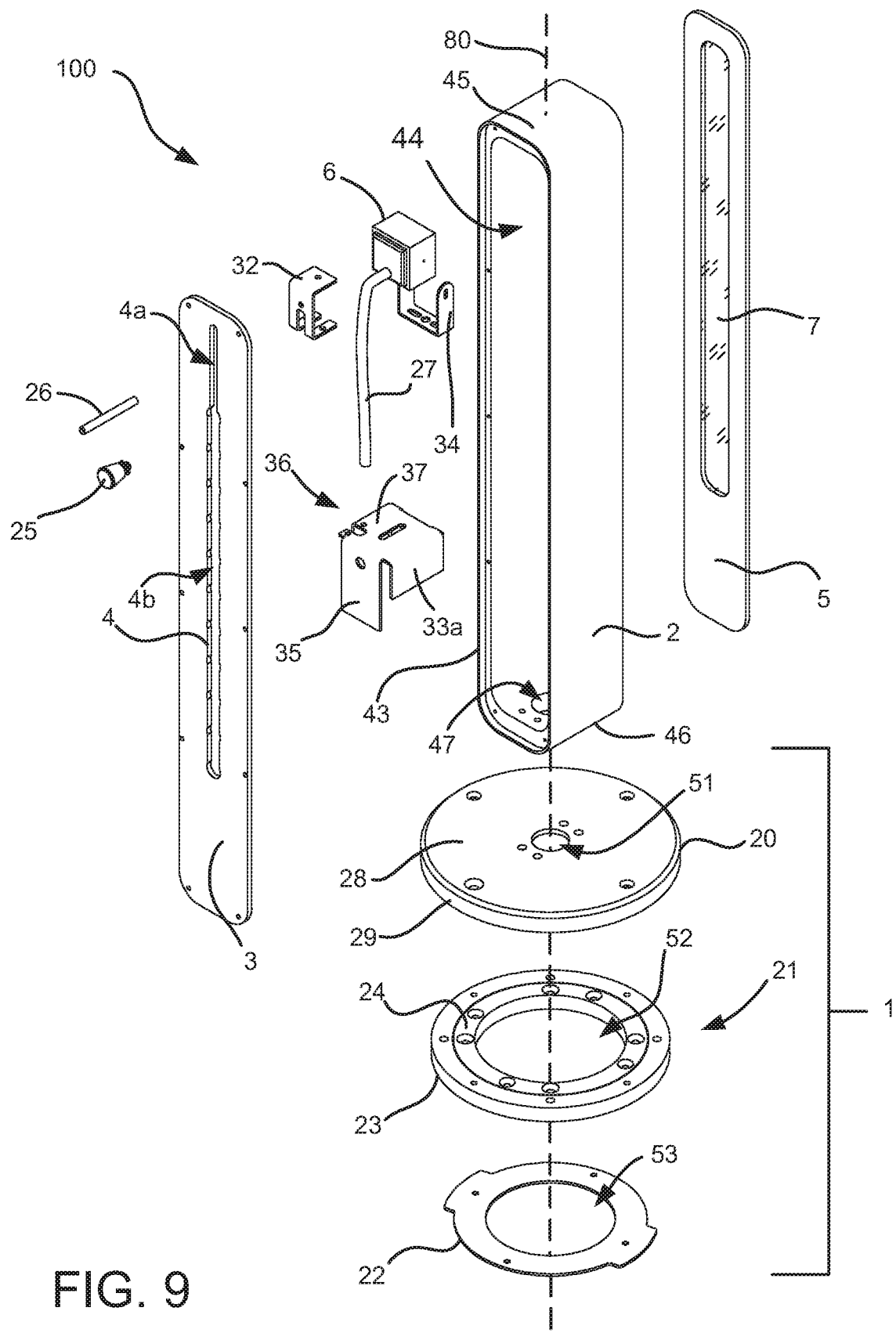
FIG. 9 is another exploded perspective view of the camera enclosure of FIG. 1 in accordance with the present disclosure.

Referring to FIGS. 8 and 9, exploded perspective views of enclosure 100 are shown in accordance with the present disclosure. As seen in FIGS. 8 and 9, main body 2 of enclosure 100 includes a front portion 8 having an opening 9, an end 45, and an opposite end 46. Furthermore, main body 2 includes a rear portion 43 revealing a hollow interior 44. Main body 2 extends along a longitudinal axis 80 from end 45 to end 46. Front portion 8 is configured to receive face plate 5, such that face plate 5 is fixedly coupled to front portion 8 of main body 2 and window 7 aligns with opening 9. Face plate 3 is coupled to rear portion 43. It is to be appreciated that window 7 and opening 9 extend in parallel to axis 80 and are each configured with a length slightly less than the length of main body 2 from end 45 to end 46. The length of window 7 and opening 9 is configured to enable the lens of camera 6 to have an unobstructed view of the exterior of housing 11 through opening 9 and window 7 throughout the entire motion of camera 6 along axis 80.

End 46 of main body 2 is coupled to base 1. Base 1 includes mounting member 20, rotation mechanism 21, and mounting member 22. Mounting member 20 is configured to be fixedly coupled to end 46 of main body 2 and mounting member 22 is configured to be disposed on and fixedly coupled to surface 70 (shown in FIG. 1). Rotational mechanism 21 includes rotational components 23, 24. Components 23, 24 are each configured as rings, where the inner circumference of ring 23 is coupled to the outer circumference of ring 24 via a plurality of balls bearings such that the inner and outer rings 23, 24 are rotatable relative to each other. Mounting member 20 is fixedly coupled to outer ring 23 of rotational mechanism 21 and mounting member 22 is fixedly coupled to inner ring 24 of rotational mechanism 21. In this way, since mounting member 20 is fixedly coupled to outer ring 23 and mounting member 22 is fixedly coupled to inner component 24, mounting members 20 and 22 are rotatable relative to each other about axis 80. Since end 46 of main body 2 is fixedly coupled to component 20, main body 2 and component 20 are rotatable relative to component 22. In this way, main body 2 and component 20 are rotatable relative to surface 70 when enclosure 100 is mounted to surface 70. It is to be appreciated that, as shown in FIG. 8, each of components 20, 23, 24, 22 are coaxially aligned with respect to axis 80.

Mounting member 20 includes a mounting portion 28 (e.g., configured as a disc) and a lip portion 29. Lip 29 extends from around the periphery of mounting portion 28 in a direction away from main body 2. When base 1 is assembled and mounted to surface 70, rotational mechanism 21 and mounting member 22 are disposed in an interior (not shown) of base 1 defined by lip 29 and lip 29 is configured to conceal rotational mechanism 21 and mounting member 22 (as seen in FIGS. 1-5).

Figure 12A:
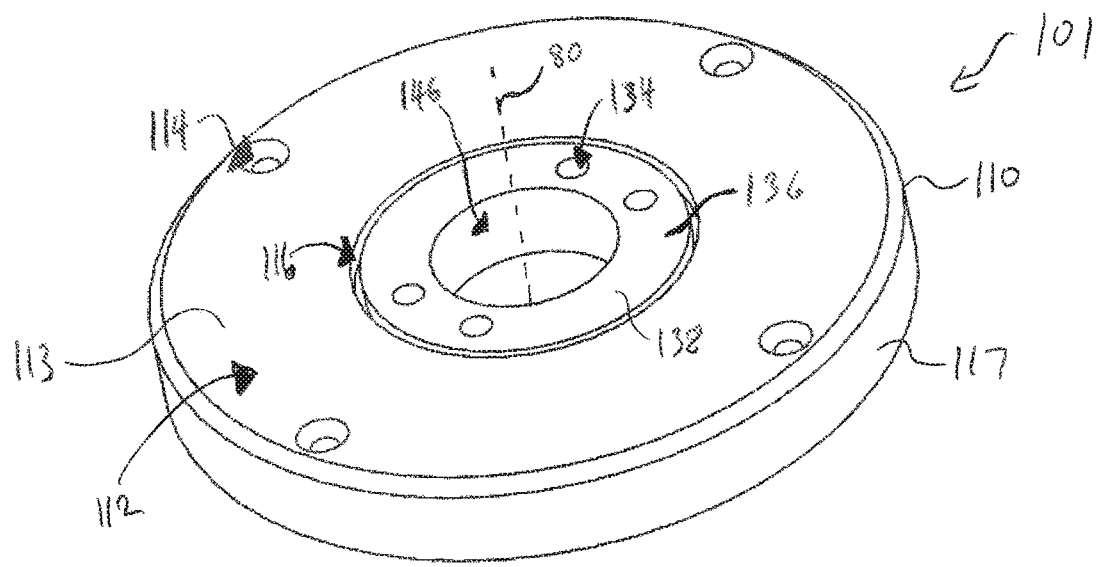
FIGS. 12A-12C are perspective views of an alternative base for the camera enclosure of FIG. 1 in accordance with another embodiment of the present disclosure.
Figure 12B:
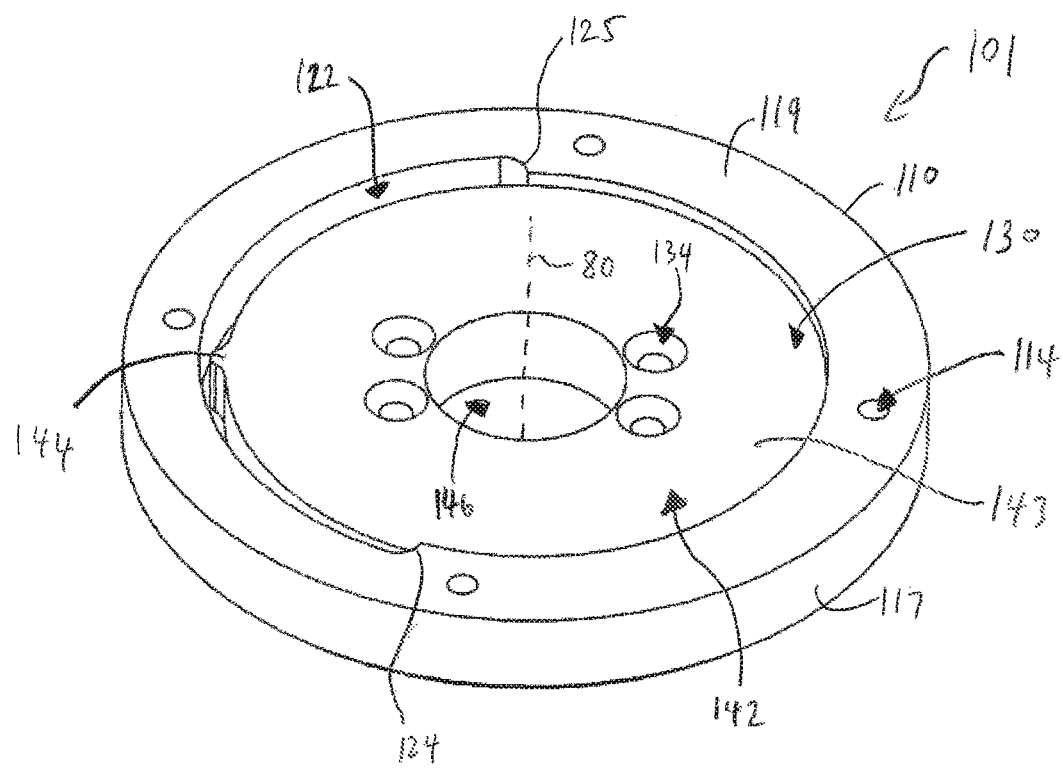
Figure 12C:
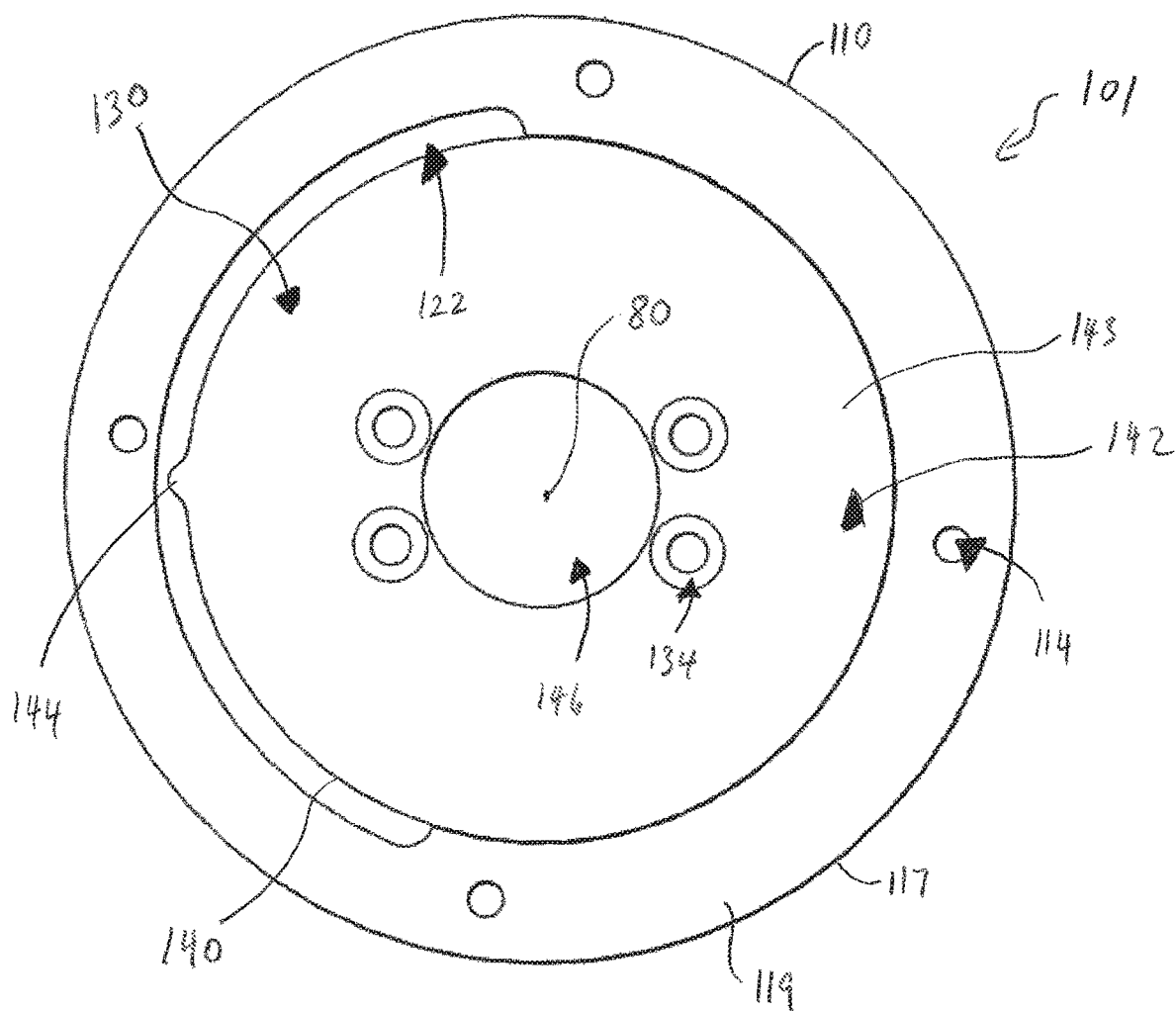

In another embodiment of the present disclosure, base 1 may be configured to enable housing 11 to rotate with respect to surface 70 without using ball-bearings. For example, referring to FIGS. 12A-12C an alternative base 101 for use with apparatus 100 is shown in accordance with the present disclosure. Base 101 includes mounting members 110, 130, each of which will be described in greater detail below.

Figure 13A:
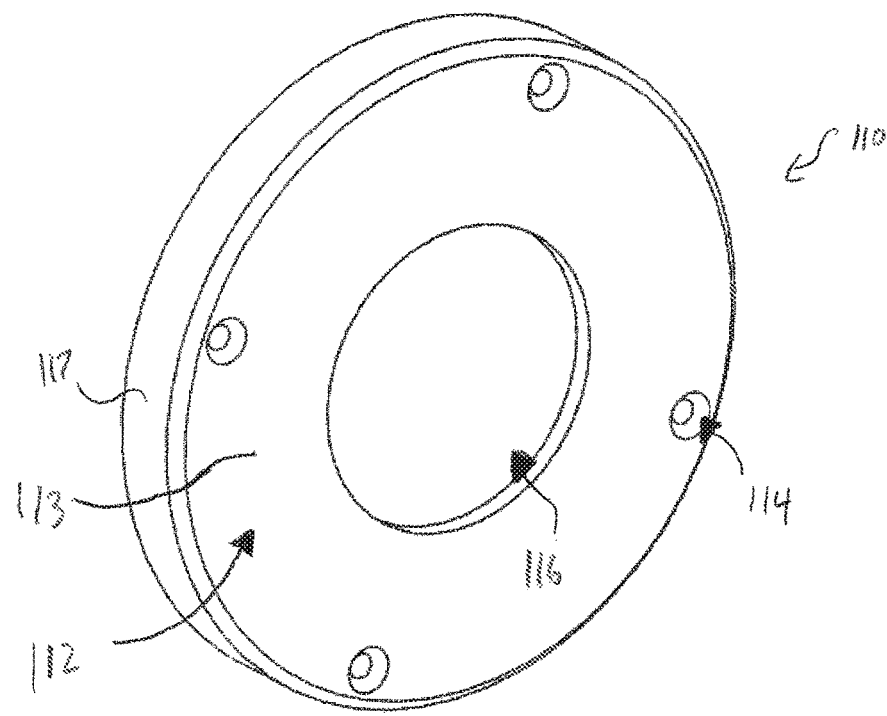
FIGS. 13A and 13B are perspective views of a first mounting member of the alternative base of FIGS. 12A-12C in accordance with the present disclosure.
Figure 13B:
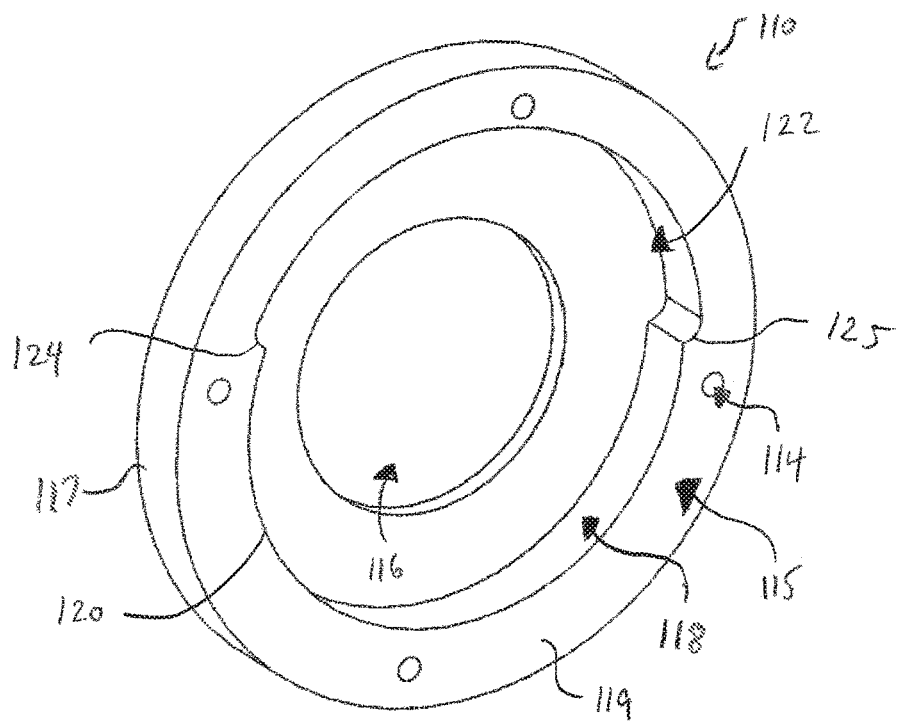

Referring to FIGS. 13A, 13B, mounting member 110 is shown in accordance with the present disclosure. Mounting member 110 is configured in the shape of a disc having a perimeter or outer circumference 117, a side 112, and an opposite side 115. Side 112 includes a planar surface 113, where surface 113 includes a circular aperture 116 centrally disposed with respect to outer circumference 117. Side 115 includes a circular slot 118 having a perimeter or outer circumference 120. Side 115 further includes a planar surface 119 disposed between outer circumference 117 of mounting member 110 and outer circumference 120 of slot 118. Aperture 116 is accessible via side 115 through slot 118. A semi-circular or arcing slot 122 is disposed around a portion of circumference 120 and include ends 124, 125. Apertures or mounting holes 114 extend through surfaces 113, 119 of mounting member 110 from side 112 to side 115 and are disposed between the outer circumference 117 of mounting member 110 and the outer circumference 120 of slot 118.

Figure 14A:
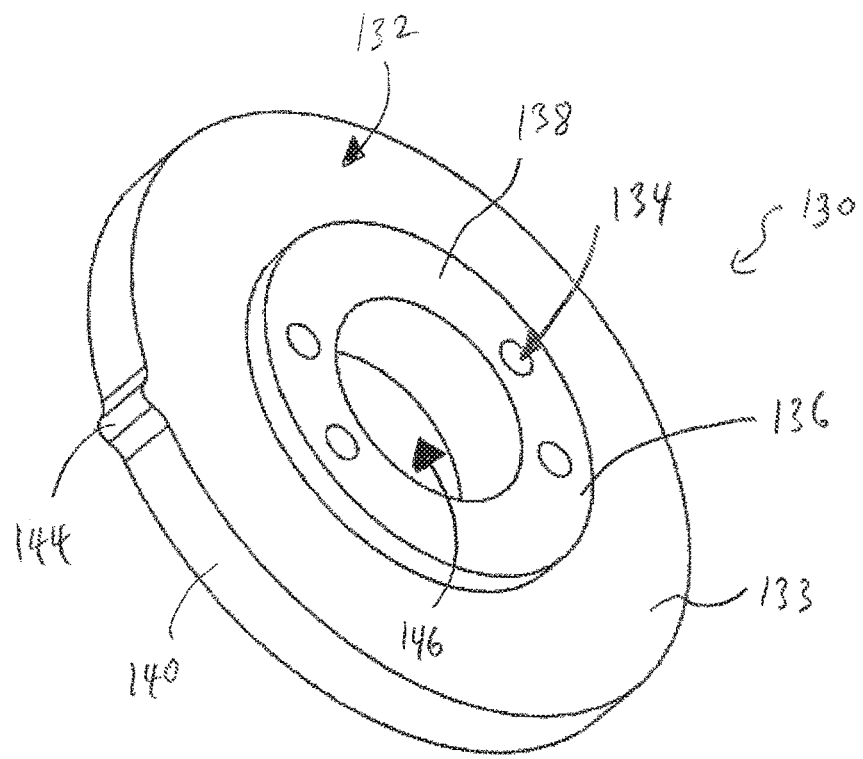
FIGS. 14A and 14B perspective views of a second mounting member of the alternative base of FIGS. 12A-12C in accordance with the present disclosure.
Figure 14B:
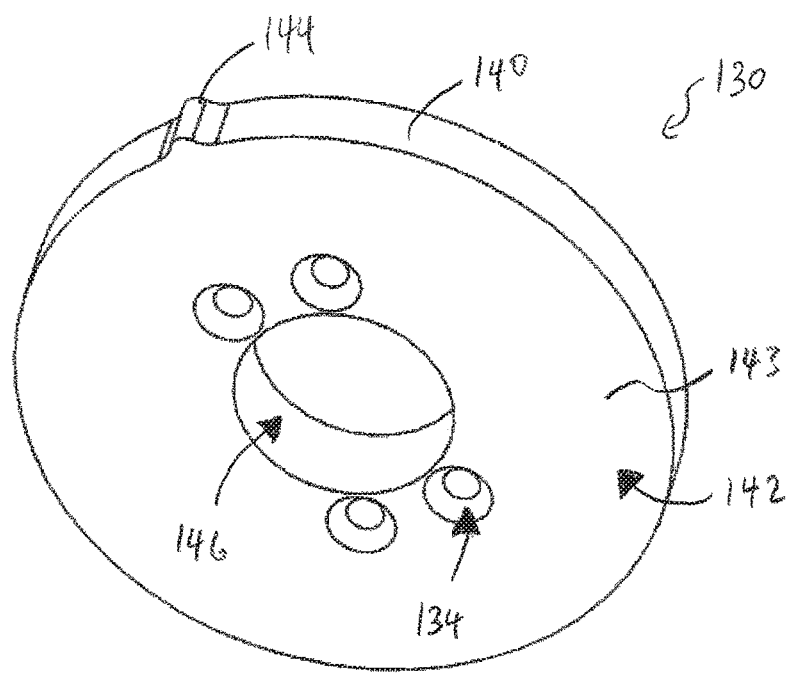

Referring to FIGS. 14A, 14B, mounting member 130 is shown in accordance with the present disclosure. Mounting member 130 is configured in the shape of a disc having a side 132 and an opposite side 142. Side 132 includes a planar surface 133 and a cylindrical extension member 136 extending from the surface 133. Extension member 136 includes a surface 138 and apertures or mounting holes 134 which extend from side 132 and through surface 138 to side 142. Side 142 includes planar surface 143. Mounting member 130 includes a perimeter or outer circumference 140 and an extension member or tab 144 extending radially away from the outer circumference 140. Mounting member 130 further includes an aperture 146 centrally disposed with respect to outer circumference 140, where aperture 146 extends from side 132 to side 142.

Referring to FIGS. 12A-14B, to assemble base 101, mounting member 130 is disposed in slot 118, such that extension member 136 is disposed through aperture 116 and tab 144 extends into arcing slot 122. When base 101 is assembled, surface 138 of extension member 136 aligns with surface 113 (i.e., surfaces 113, 136 are level with respect to each other and extend along the same plane). Outer circumference 140 of mounting member 130 is disposed adjacent to circumference 120 of slot 118. Furthermore, mounting members 110, 130 are dimensioned such that surface 119 extends past surface 143.

To couple base 101 to main body 2, mounting member 130 is coupled to end 46 of main body 2 by disposing fastening members through apertures 134 and into matching apertures in end 46 of main body 2. To couple base 101 to surface 70, fastening members are disposed through apertures 114 and into surface 70, such that mounting member 110 is fixedly coupled to surface 70. As stated above, mounting members 110, 130 are dimensioned such that surface 119 extends past surface 143. In this way, surface 143 does not touch surface 70. Since mounting member 130 is not coupled to mounting member 110 and surface 143 does not touch surface 70, mounting member 130 is free to rotate with respect to mounting member 110 about axis 80. In this way, when mounting member 130 is coupled to main body 2, and mounting member 110 is coupled to surface 70, housing 11 is rotatable relative to surface 70 about axis 80. When mounting member 130 is rotated relative to mounting member 110, tab 144 travels through arced slot 122 until tab 144 comes into contact with ends 124, 125. The arc length of slot 122 from end 124 to end 125 defines and limits the rotational range of motion of mounting member 130 relative to mounting member 110 (and thus the rotational range of motion of housing 11 with respect to surface 70).

Figure 15A:
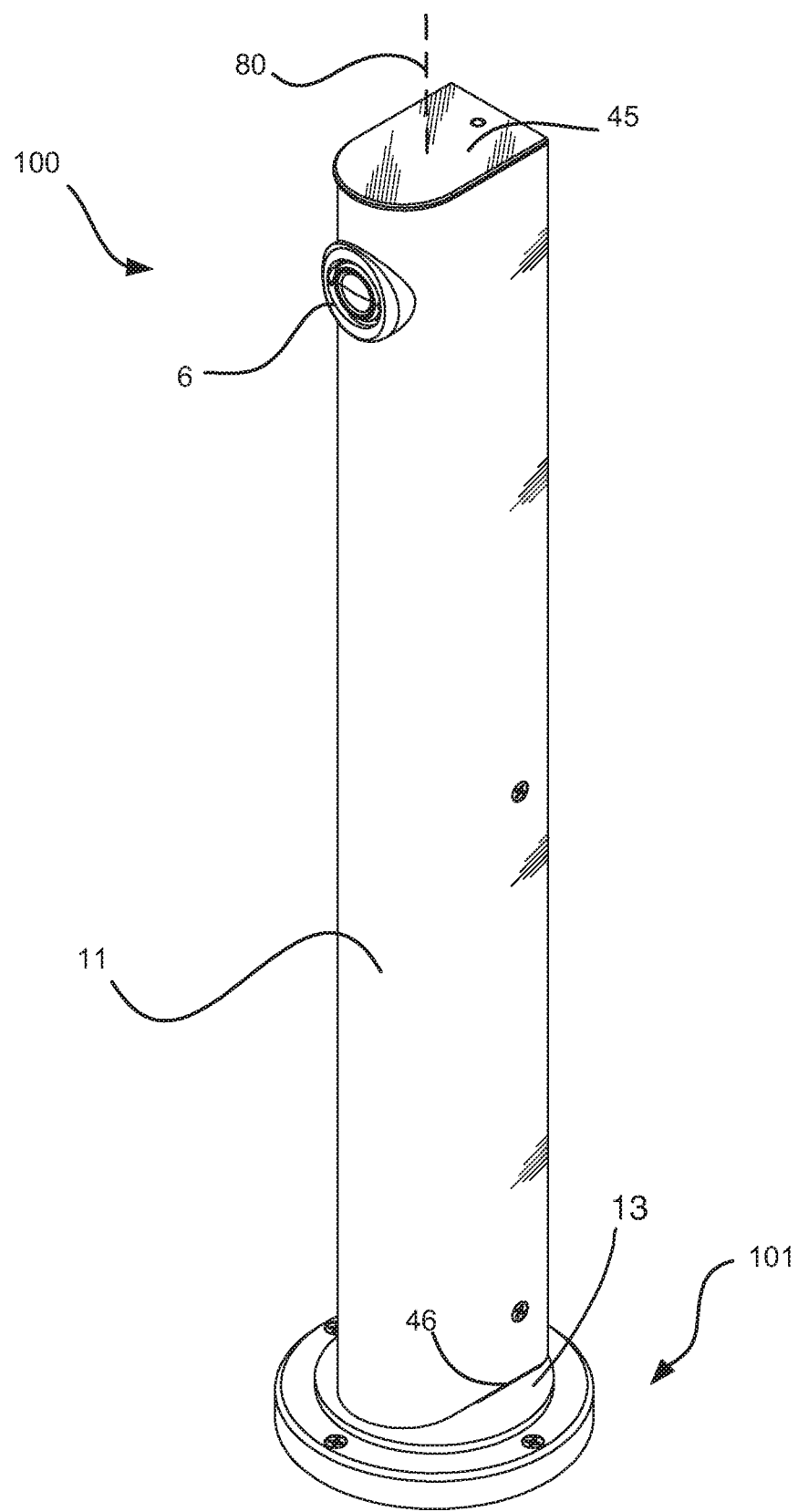
FIG. 15A-15C illustrate alternative embodiments of the camera enclosure of FIG. 1 in accordance with the present disclosure.

Referring to FIG. 15A, base 101 is shown coupled to an alternative enclosure 100 (which will be described below). As shown in FIG. 15A, in one embodiment, end 46 of main body 2 includes a disc 13. Disc 13 is configured such that, when base 101 is coupled to housing 11, extension member 136 is concealed from view.

Figure 10:
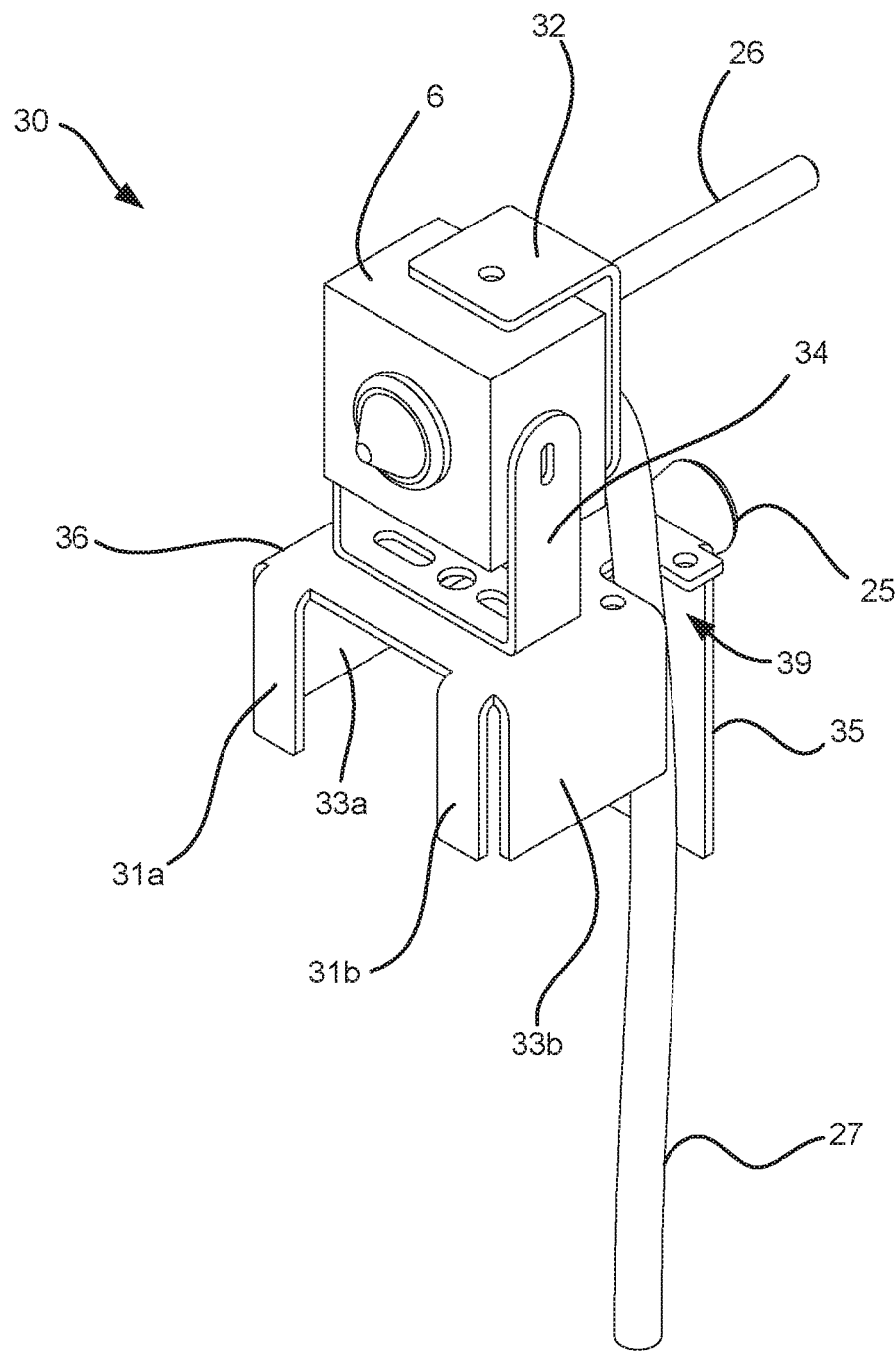
FIGS. 10 and 11 are perspective views of a camera mounting assembly and camera of the camera enclosure of FIG. 1 in accordance with the present disclosure.
Figure 11:
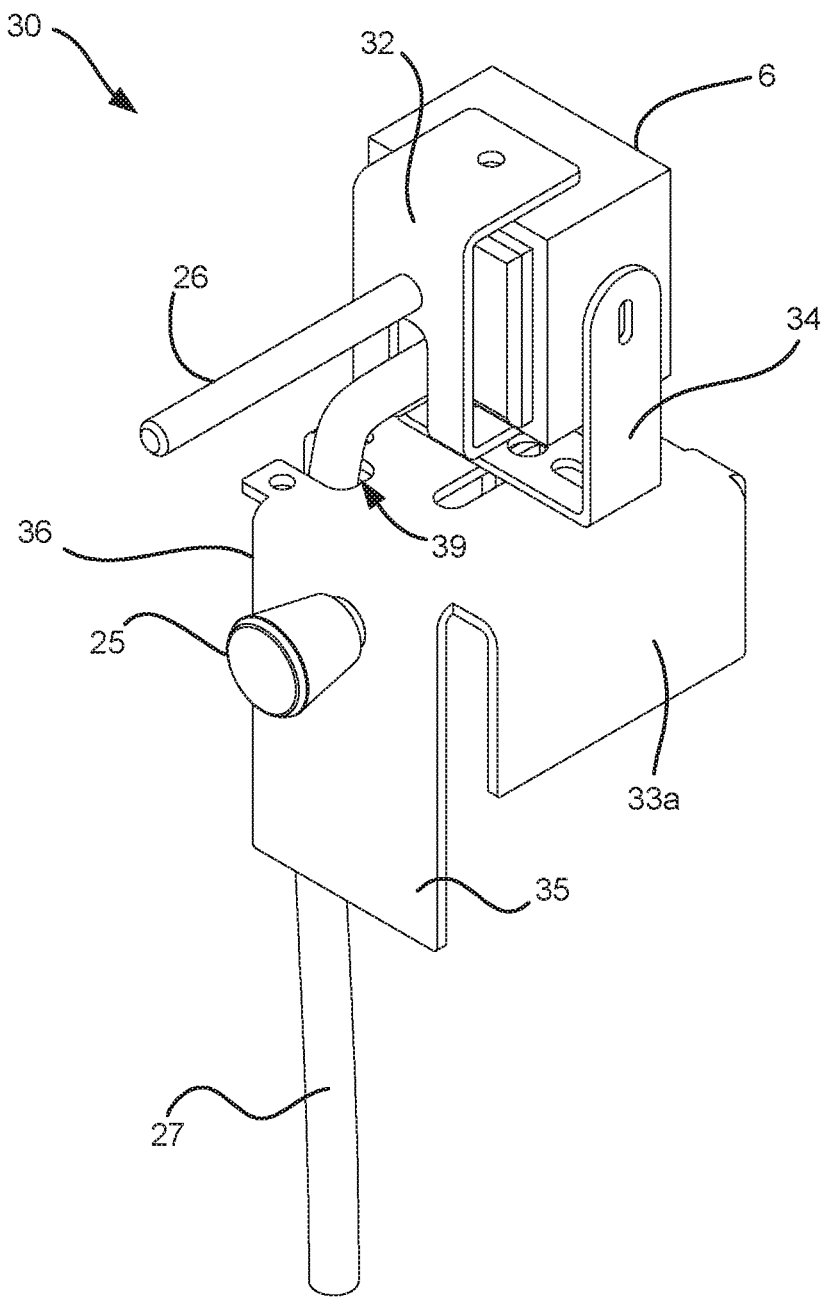

Referring again to FIGS. 8 and 9, camera 6 is slidably mounted within hollow interior 44 of main body 2 via a mounting assembly 30, including components 32, 34, 36. Referring to FIGS. 10 and 11, mounting assembly 30 is shown in greater detail in accordance with the present disclosure. As shown in FIGS. 10 and 11, camera 6 is coupled to components 32 and 34. Camera 6 is fixedly coupled to component 32. Camera 6 is coupled to component 34, such that camera 6 may be tilted relative to component 34. Component 34 is fixedly coupled to component 36. Component 36 is dimensioned in a manner similar to the inner walls or surfaces of interior 44. For example, component 36 includes a planar surface 37, where component 34 is fixedly coupled to surface 37. Component 36 further includes extension members 31a, 31b, 33a, 33b, and 35, which are each configured as substantially planar surfaces extending in parallel to the longitudinal axis 80 and perpendicularly to surface 37. Extension members 31a, 31b, 33a, 33b, and 35, collectively, are dimensioned to substantially fit to the inner walls of interior 44, with the planar surface of members 31a, 31b contacting a first wall, the planar surface of member 33a contacting a second wall, the planar surface of members 33b contacting a third wall, and the planar surface of member 35 contacting a fourth wall. In this way, when mounting assembly 30 is disposed in interior 44, extension members 31a, 31b, 33a, 33b, and 35, collectively of component 36 enable mounting assembly 30 to slide within interior 44 along longitudinal axis 80 in a stable manner (i.e., with planar surface 37 remaining substantially perpendicular to axis 80) without requiring the use of any other components (e.g., a track or bearing system). In one embodiment, surface 37 includes a slot 39, such that a cable 27 of camera 6 is disposed through the slot 39.

Figure 3:
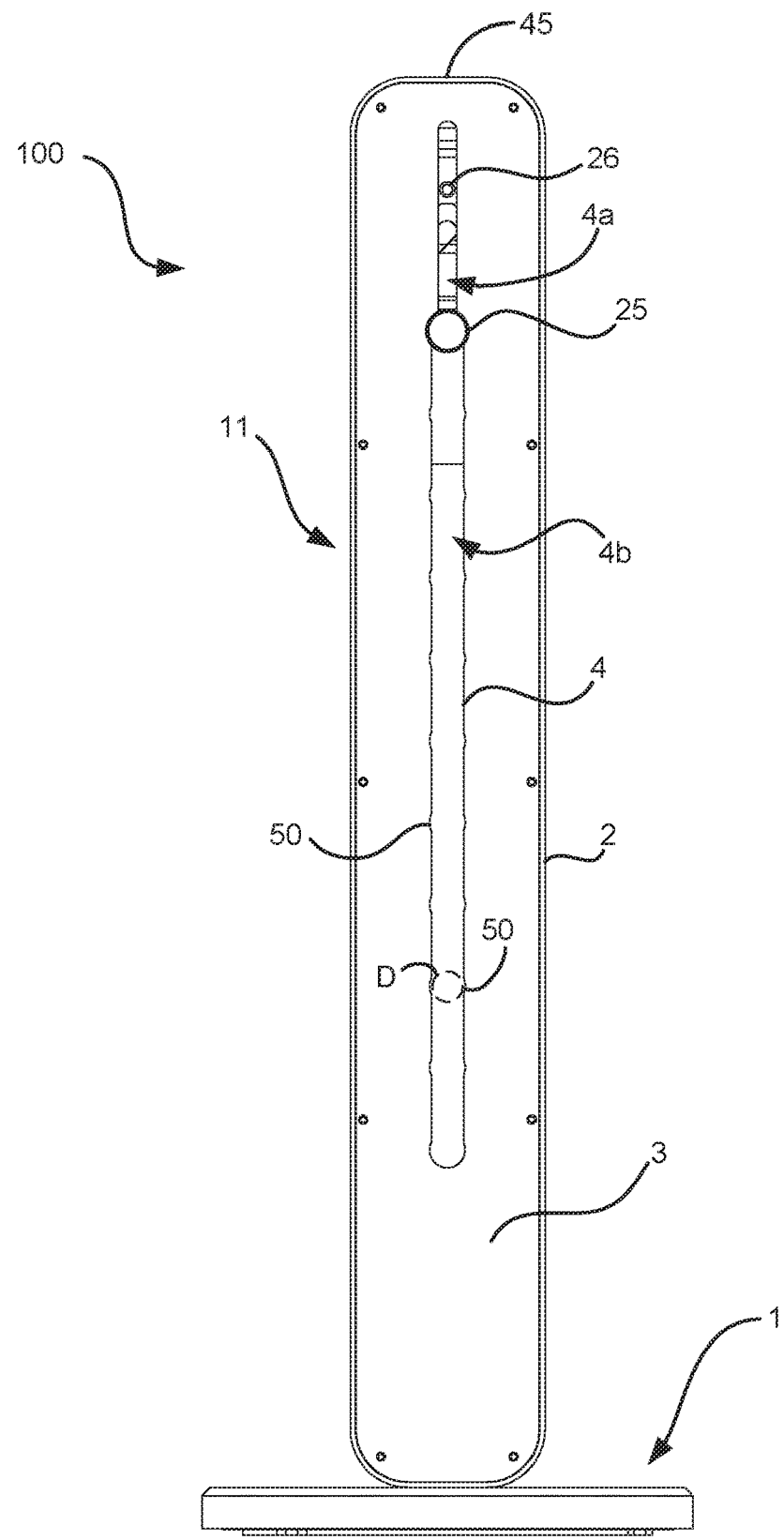
FIG. 3 is a rear view of the camera enclosure of FIG. 1 in accordance with the present disclosure.
Figure 4:
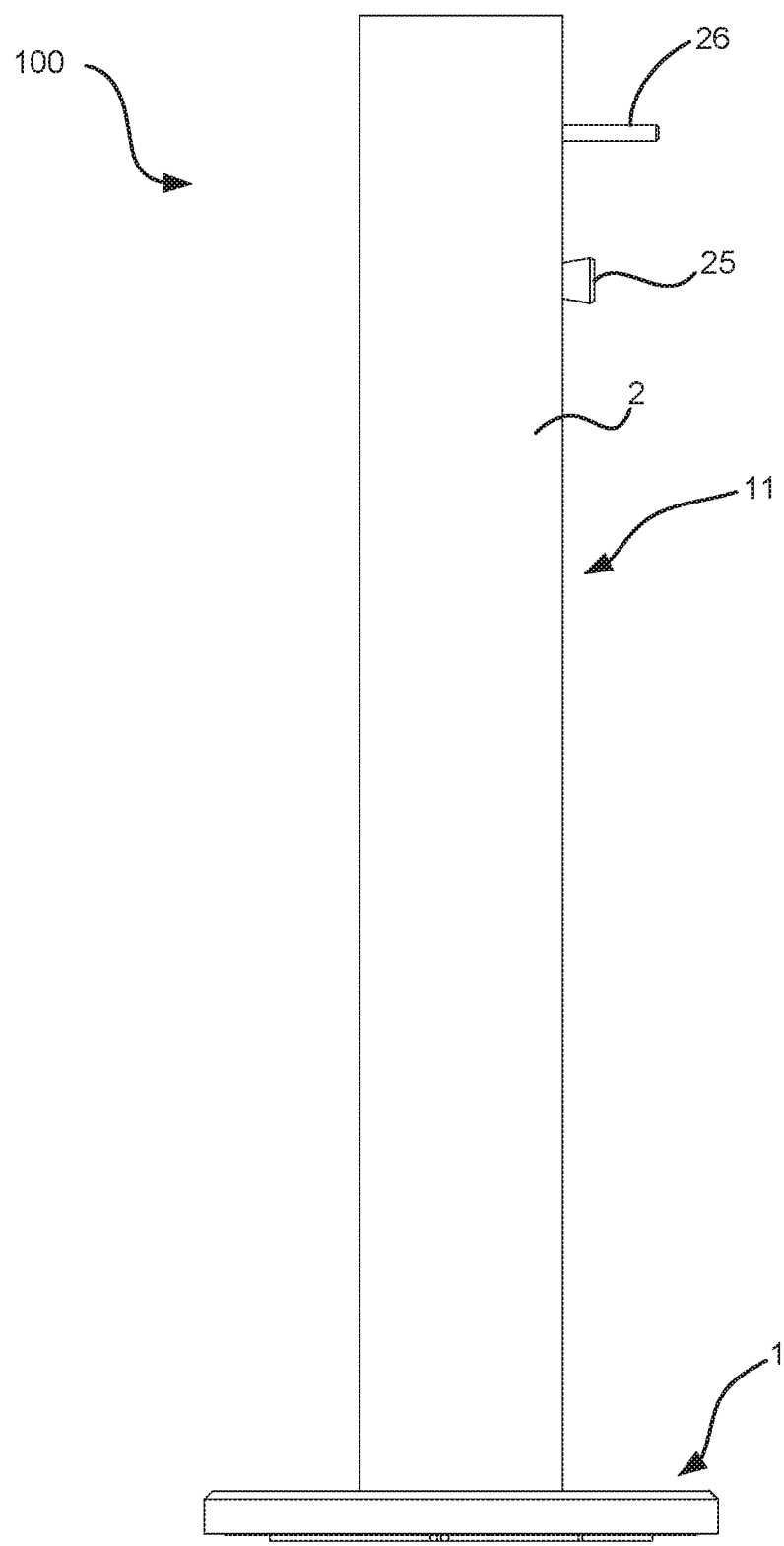
FIG. 4 is a side view of the camera enclosure of FIG. 1 in accordance with the present disclosure.
Figure 5:
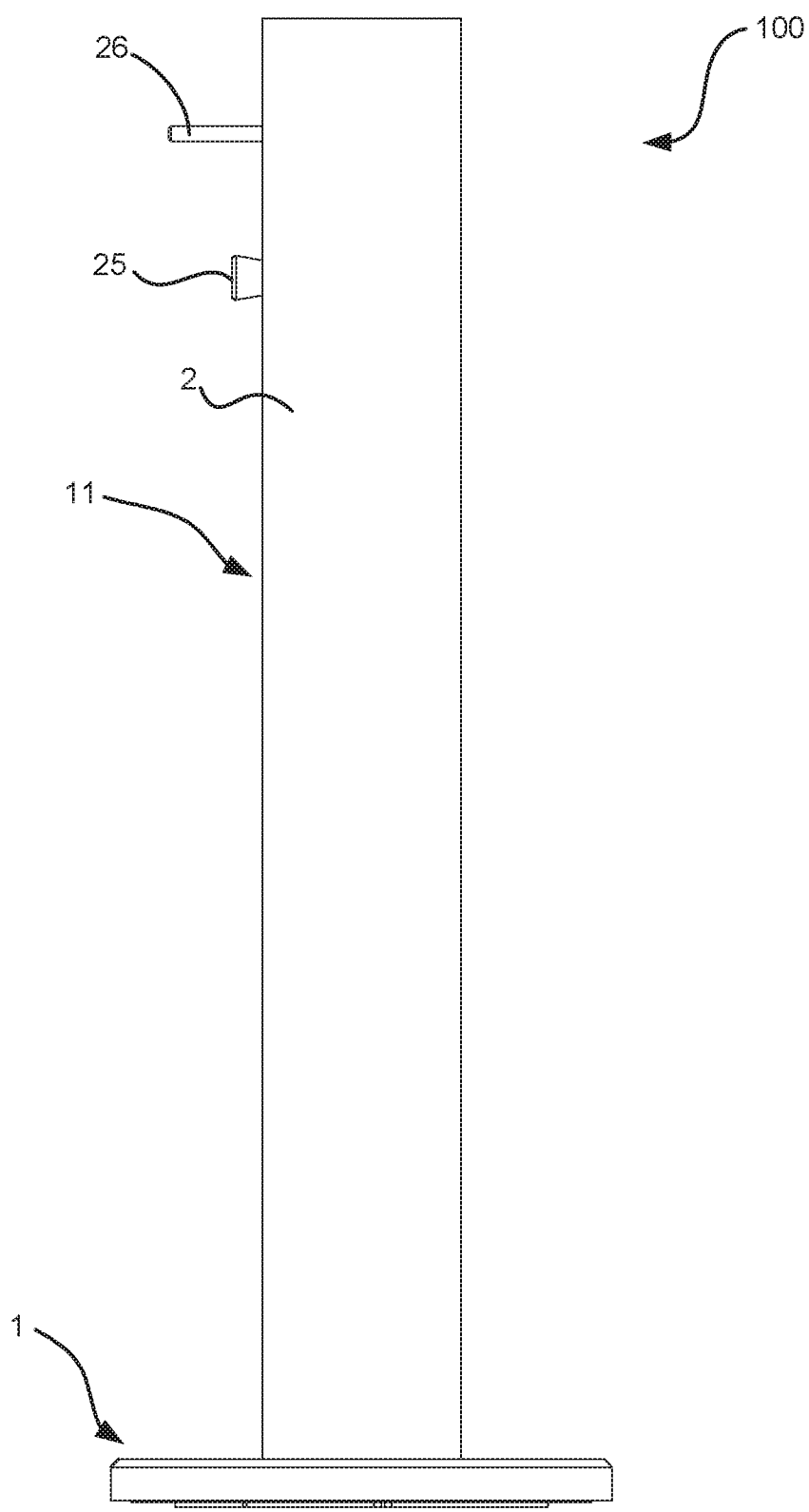
FIG. 5 is a side view of the camera enclosure of FIG. 1 opposite to the side view shown in FIG. 4 in accordance with the present disclosure.
Figure 6:
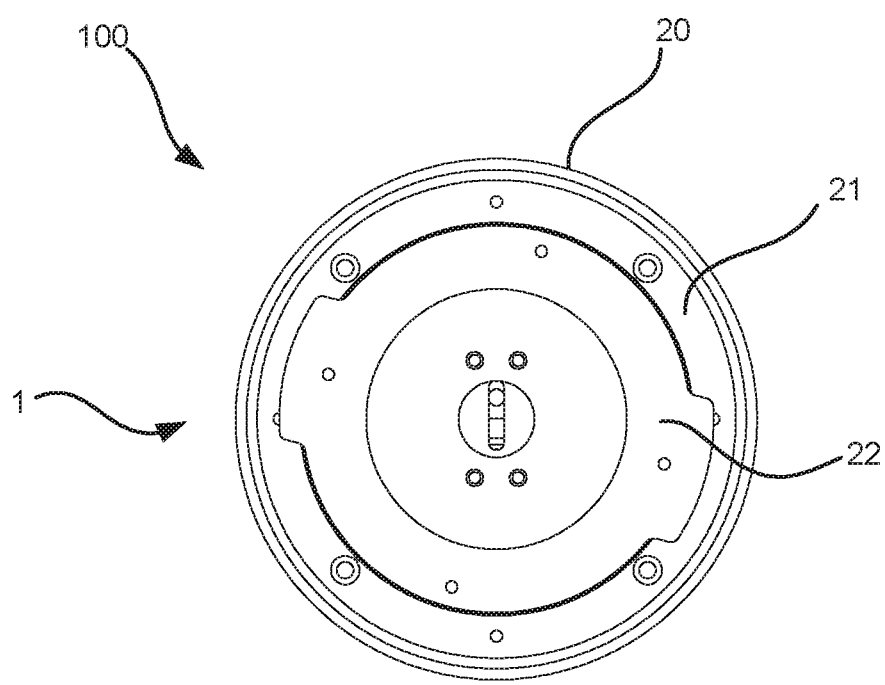
FIG. 6 is a bottom view of the camera enclosure of FIG. 1 in accordance with the present disclosure.
Figure 7:
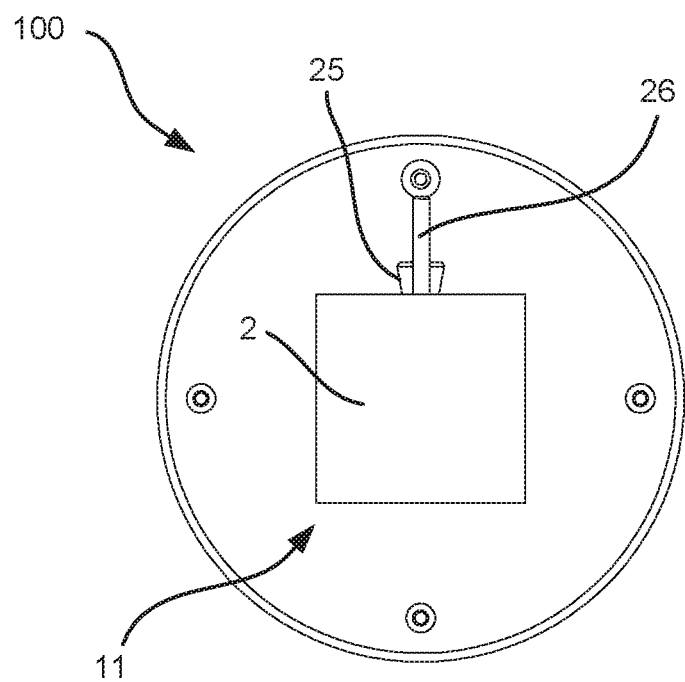
FIG. 7 top view of the camera enclosure of FIG. 1 in accordance with the present disclosure.

Lever 26 is coupled to component 32 and knob 25 is coupled to component 36, where each of lever 26 and knob 25 are disposed through slot 4 of rear face plate 3. Lever 26 may be tilted to tilt camera 6 relative to component 34 and therefore adjust the tilting angle of camera 6. In one embodiment, knob 25 is configured as a spring plunger, where a spring in knob 25 biases knob 25 toward slot 4 and interior 44. Furthermore, as shown in FIG. 3, slot 4 includes a plurality of notches or slots 50 that are wider than the rest of slot 4. Each of these notches 50 are configured to form at least a partial output of a circle D. In one embodiment, knob 25 is configured in a conical shape such that, when knob 25 is disposed in and engaging one of the notches 50 and biased toward interior 44, knob 25 is not slideable along slot 4. When knob 25 is pulled away from slot 4 and main body 2, the conical shape of knob 25 is released from portion 50 and knob 25 may be lifted or lowered by a user to raise or lower mounting assembly 30 and camera 6 within interior 44 as desired. It is to be appreciated that as knob 25 slides along slot 4, mounting assembly 30, lever 26, and camera 6 also slide along slot 4 in unison. The user may release the knob 25 into another notches 50 along slot 4 to retain camera 6 at a desired height along slot 4. It is to be appreciated that window 7 and opening 9 extend in a direction parallel to axis 80, such that, in any height that camera 6 is moved to using assembly 30 and knob 25, the lens of camera 6 has a clear line of sight to the exterior of housing 11.

In one embodiment, slot 4 includes a first portion 4a and a second portion 4b, with notches 50 included in second portion 4b. Second portion 4b is configured with a wider width than first portion 4a. Knob 25 is configured such that the width of knob 25 is larger than the width of portion 4a and thus knob 25 cannot enter portion 4a. In this way, the range of motion of knob 25 along slot 4 is limited by the ends of portion 4b. Lever 26 is configured such that the width of lever 26 enables lever 26 to travel through both portions 4a, 4b of slot 4. The length of portion 4b is selected such that when knob 25 is in the highest possible notch 50 (i.e., closest to end 45 of main body 2, as shown in FIG. 3), camera 6 does not hit end 45 and become damaged. Furthermore, when knob 25 is in the highest possible notch 50, lever 26 is disposed in portion 4a of slot 4.

A cable 27 is coupled to camera 6. Although not shown, cable 27 extends through hollow interior 44, through aperture 47 (shown in FIG. 9) of end 46, and through aligning apertures 51, 52, 53 of components 20, 21, 22 of base 1, or through aperture 51 of component 20 and aperture 146 of base 101, such that cable 27 may be disposed through an aperture of surface 70 to couple camera 6 to a computer in communication with camera 6. It is to be appreciated that in one embodiment, cable 27 is configured as an RJ-45 cable, where the end of cable 27 that extends through the surface 70 is configured as an RJ-45 connector that may be connected to an RJ-45 receptacle of a computing device disposed underneath the surface that enclosure 100 is mounted to.

Referring again to FIG. 1, in use, the camera 6 housed within enclosure 100 may be advanced or retracted (by advancing or retracting knob 25 along slot 4) toward base 1 or away from base 1 (as indicated by letter A in FIG. 1) along longitudinal axis 80, rotated clockwise or counter clockwise (by main body 2 relative to surface 70) about longitudinal axis 80 (as indicated by letter C in FIG. 1), and tilted (via lever 26) in a direction toward base 1 or away from base 1 (as indicated by letter B in FIG. 1) to achieve a plurality of positions and viewing angles.

The adjustable camera enclosure 100 provides many advantages. In one exemplary use, the enclosure 100 may be mounted to a countertop within a commercial setting to take pictures and/or videos of clients. For example, the camera enclosure 100 may be used by a bank teller, cashier, or customer service representative to adjust the viewing angle of camera 6 to ensure a clear picture of a desired target is recorded. Additionally, the cable 27 within camera enclosure 100 may be routed to one or more devices within the desk of countertop 70 (as described above). It is to be appreciated that camera cable 27 may include multiple cables or wires associated with the operation for camera 6. For example, in one embodiment, camera 6 includes a power cable to provide power to camera 6, and a data transfer cable to allow camera 6 to transfer data to a computer that is coupled to camera 6 via cable 27. In one embodiment, cable 27 is an RJ-45 cable, as described above.

It is to be appreciated that camera enclosure 100 is configured for use with any one of a plurality of different miniature pin hole and/or stick cameras 6. For example, camera 6 may be, but is not limited to, an IP network high-performance camera, a high-definition HD camera, a camera including night and/or thermal vision, etc. In one embodiment, camera 6 may be used to capture photographs and/or videos. In some embodiments, camera 6 may also have audio recording capabilities.

In one embodiment, camera 6 is configured to communicate wirelessly with a remote computing device via a wireless network (e.g., Wi-Fi, 3G, 4G, LTE, etc.) In this embodiment, where camera 6 includes a portable power supply (e.g., batteries) cable 27 may be removed from camera 6. Furthermore, where camera 6 is a wireless camera, base 1 may be disposed on surface 70 without being fixedly mounted to surface 70. In this way, while in use, enclosure 100 may be placed at any position on surface 70.

In one embodiment, housing 11 and/or base 1 may be made of aluminum, plastic, or any other suitable lightweight, durable material.

It is to be appreciated that in some embodiments, enclosure 100 may be modified to include only a subset of the adjustability features described above. For example, one or more of the tiltability of camera 6, the extension and retraction of mount 30 along axis 80, and the rotation of housing 11 about axis 80 may be removed without deviating from the scope of the present disclosure.

Figure 15B:
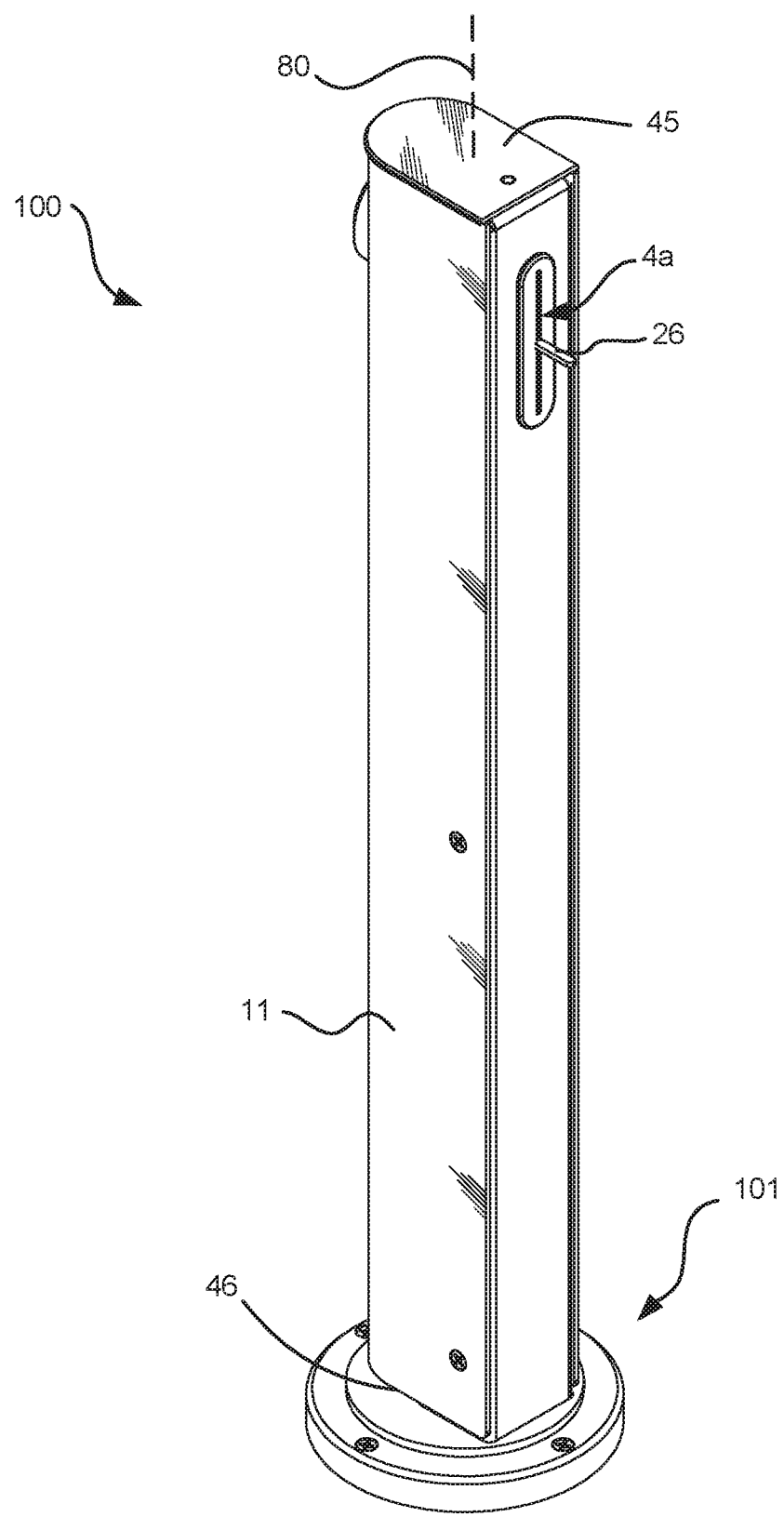
Figure 15C:
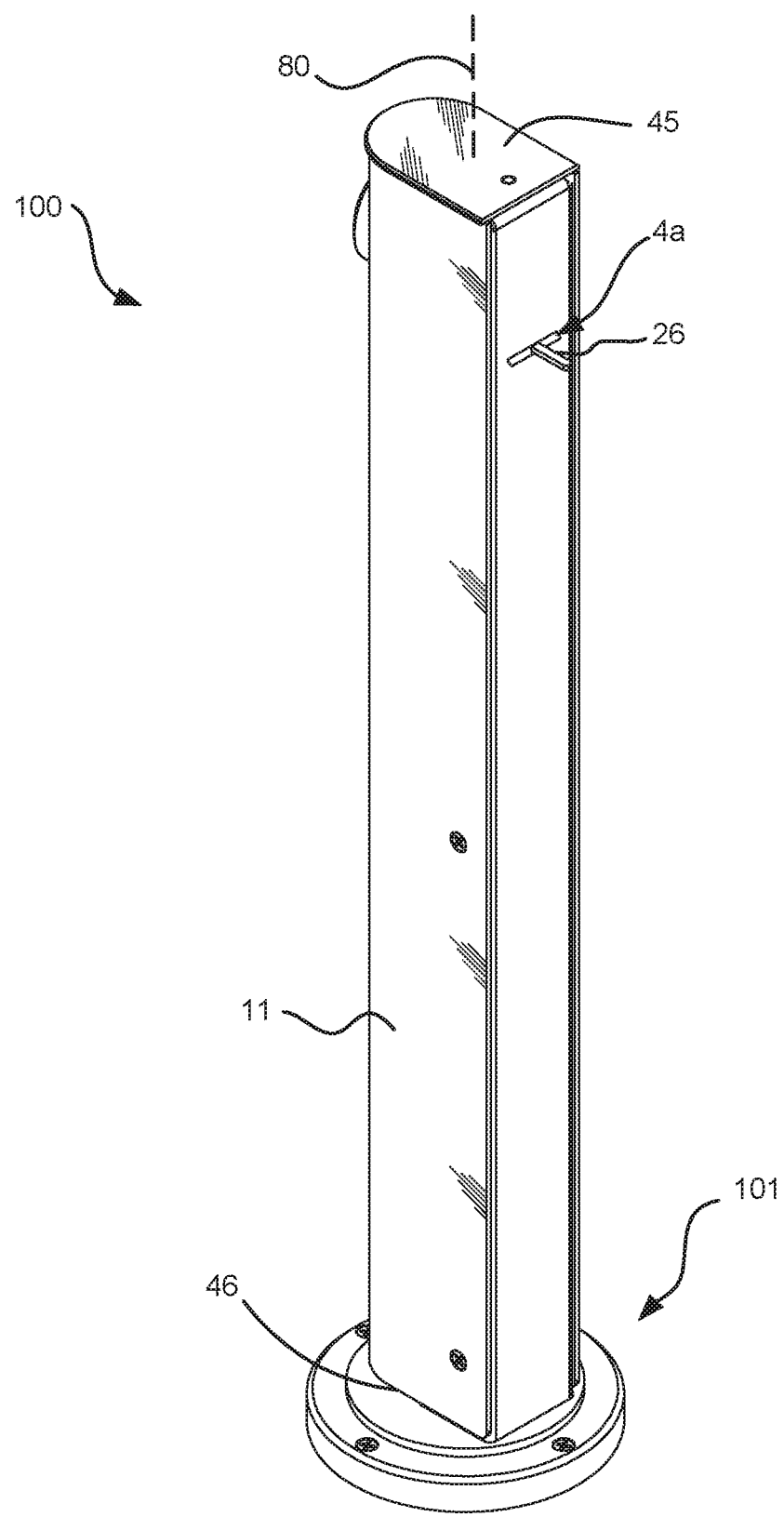

For example, referring to FIGS. 15A-15B, in one embodiment, enclosure 10 may be modified, such that, portion 4b of slot 4 and knob 25 may be removed and slot 4 only includes portion 4a and camera mounting assembly 30 is configured to be fixedly coupled within interior 44 at a fixed height. In this embodiment, camera 6 is mounted within interior 44 at a fixed height and camera 6 may be tilted via lever 26 and housing 11 may be rotated about axis 80 to rotate camera 6. In this embodiment, portion 4a of slot 4 may be disposed as shown in FIG. 15b in a direction parallel to axis 80 to tilt camera toward end 45 of main body 2 or end 46 of main body 2. Alternatively, referring to FIG. 15C, portion 4a of slot 4 may be disposed perpendicularly to axis 80 to tilt camera along an axis perpendicular to axis 80. In the embodiment shown in FIG. 15C, base 101 may be configured such that base 101 is not rotatable relative to axis 80. Alternatively, base 101 may be removed and end 46 of housing 11 may be coupled directly to a surface, such as surface 70.

In any of the embodiments shown above, camera window 7 may be removed and the camera lens of camera 6 may view the exterior of the housing 11 directly via opening 9.

It is to be appreciated that the various features shown and described are interchangeable, that is a feature shown in one embodiment may be incorporated into another embodiment.

Although embodiments which incorporate the teachings of the present disclosure have been shown and described in detail herein, those skilled in the art can readily devise many other varied embodiments that still incorporate these teachings. Having described preferred embodiments of an adjustable camera enclosure (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the disclosure.

What is claimed is:

1. An apparatus comprising:
a housing extending along a longitudinal axis and including a hollow interior, a first end, a second end and an aperture in a wall of the housing, the aperture extending in a direction parallel to the longitudinal axis;
a camera mounting assembly disposed in the hollow interior of the housing and slidable within the hollow interior along the longitudinal axis, the camera mounting assembly configured to receive a camera such that a lens of the camera is oriented to the aperture of the housing; and
a base coupled to the second end of the housing and configured to be disposed on a surface, wherein the base is configured to be rotatable about the longitudinal axis relative to the surface to rotate the housing about the longitudinal axis.

2. The apparatus of claim 1, wherein the base is configured to be mounted to the surface.

3. The apparatus of claim 2, wherein the base includes a first mounting component, a second mounting component, a first rotational component, and a second rotational component, the first mounting component fixedly coupled to the second end of the housing and the first rotational component and the second mounting component fixedly coupled to the second rotational component and the surface, the first and second rotational components being rotatable relative to each other.

4. The apparatus of claim 3, wherein the first rotational component and the second rotational component are rotatable with respect to each other via a plurality of ball bearings.

5. The apparatus of claim 3, wherein the first mounting component includes a lip portion configured to extend in a direction away from the housing, the lip portion configured to conceal the second mounting component and the first and second rotational components when the base is mounted to the surface.

6. The apparatus of claim 1, wherein the base includes a first mounting member and a second mounting member, the first mounting member fixedly coupled to the surface, the second mounting member fixedly coupled to the second end of the housing, the first and second mounting members configured to be rotatable relative to each other.

7. The apparatus of claim 6, wherein the first mounting member includes a first side and a second side, the first side fixedly coupled to the surface and including a slot and the second side including an aperture accessible via the slot, the second mounting member includes a first side and a second side, the second side of the second mounting member including an extension member extending from the first side, wherein the second mounting member is disposed in the slot of the first mounting member such that the second mounting member is rotatable within the slot about the longitudinal axis and the extension member extends through the aperture and is fixedly coupled to the second end of the housing.

8. The apparatus of claim 7, wherein the first side of the first mounting member extends past the first side of the second mounting member such that the first side of the first mounting member contacts the surface and the first side of the second mounting member does not contact the surface.

9. The apparatus of claim 1, wherein the camera includes at least one cable and the second end of the housing includes a second aperture, the base includes a third aperture and the surface includes a fourth aperture, the second and third apertures being coaxially aligned with the longitudinal axis and the cable extends through the second, third, and fourth apertures.

10. The apparatus of claim 9, wherein the cable is configured to be coupled to at least one computing device.

11. The apparatus of claim 1, wherein the housing includes a slot extending in a direction parallel to the longitudinal axis and the apparatus further comprises a knob disposed through the slot and coupled to the camera mounting assembly, the knob slidable along the slot to slide the camera mounting assembly along the longitudinal axis.

12. The apparatus of claim 11, wherein the slot includes a plurality of notches spaced apart along the slot and the knob is configured to engage any one of the plurality of notches to maintain the camera mounting assembly at a fixed height within the interior of the housing.

13. The apparatus of claim 12, wherein the knob includes a spring configured to bias the knob toward the slot and the interior of the housing.

14. The apparatus of claim 13, wherein when the knob is biased toward the housing and engages any one of the plurality of notches, the knob is not slidable along the slot and when the knob is pulled away from the housing and disengages any one of the plurality of notches, the knob is slidable along the slot.

15. The apparatus of claim 11, further comprising a lever disposed through the slot and coupled to the camera mounting assembly such that the lever is advanceable along the slot, wherein the camera mounting assembly includes a tilt mounting member coupled to the camera and configured to enable the camera to be tilted with respect to the housing when the lever is advanced along the slot.

16. The apparatus of claim 1, wherein the housing includes a camera window extending in a direction parallel to the longitudinal axis and aligned with the aperture.

17. The apparatus of claim 1, wherein the aperture includes a longitudinal length selected to enable the lens of the camera to have an unobstructed view of the exterior of the housing through the aperture as the camera mounting assembly slides along the longitudinal axis.

18. The apparatus of claim 1, wherein the camera mounting assembly is dimensioned to interact with inner walls of the interior of the housing to enable the camera mounting assembly to slide along the longitudinal axis.

19. An apparatus comprising:
a housing extending along a longitudinal axis and including a hollow interior, a first end, a second end and an aperture in a wall of the housing, the aperture extending in a direction parallel to the longitudinal axis;
a camera mounting assembly disposed in the hollow interior of the housing and slidable within the hollow interior along the longitudinal axis, the camera mounting assembly configured to receive a camera such that a lens of the camera is oriented to the camera window of the housing, the camera mounting assembly further configured to enable the camera to be tilted with respect to the housing; and
a base coupled to the second end of the housing and configured to be disposed on a surface, wherein the base is configured to be rotatable about the longitudinal axis relative to the surface to rotate the housing about the longitudinal axis.

* * * * *